(12) United States Patent
Rollinger

(10) Patent No.: US 7,393,147 B1
(45) Date of Patent: Jul. 1, 2008

(54) OPTICAL TO ELECTRICAL BACKSHELL CONNECTOR

(75) Inventor: Andrew R. Rollinger, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/651,713

(22) Filed: Jan. 10, 2007

(51) Int. Cl.
*G02B 6/36* (2006.01)
(52) U.S. Cl. .......................................... 385/92
(58) Field of Classification Search ................. 385/101, 385/100, 88, 89, 92
See application file for complete search history.

(56) References Cited

U.S. PATENT DOCUMENTS

| | | | | |
|---|---|---|---|---|
| 3,809,908 A | * | 5/1974 | Clanton | 385/88 |
| 4,666,242 A | * | 5/1987 | Cairns | 385/75 |
| 6,351,593 B1 | * | 2/2002 | Pollack et al. | 385/138 |

FOREIGN PATENT DOCUMENTS

JP 09161895 A * 6/1997

* cited by examiner

*Primary Examiner*—Quyen P Leung
(74) *Attorney, Agent, or Firm*—Leonard A. Alkov

(57) ABSTRACT

An optical cable backshell connector for an optical cable having a plurality of optical fibers and a protective jacket. The novel backshell connector includes a backshell housing secured to the protective jacket and a mechanism disposed within the housing for converting optical signals from the optical fibers into electrical signals. In an illustrative embodiment, the backshell includes a plurality of receiver subassemblies, each receiver subassembly adapted to receive an optical signal from one of the optical fibers and convert the optical signal to an electrical signal. The backshell also includes an electrical output connector adapted to output the electrical signals to an electronics module. In a preferred embodiment, each receiver subassembly includes a photodiode and a matching circuit integrated into a single package. An optical ferrule is attached to each fiber for coupling the fiber to the receiver subassembly.

24 Claims, 7 Drawing Sheets

OPTICAL TO ELECTRICAL BACKSHELL CONNECTOR

BACKGROUND OF THE INVENTION

1. Field of the Invention

The present invention relates to fiber optics. More specifically, the present invention relates to backshell connectors for optical fiber cables.

2. Description of the Related Art

Fiber optics is used in an ever increasing number of system designs. Optical fibers permit data transmission over longer distances and at higher data rates than electronic transmission. The optical interface, however, between an optical fiber and an electrical system is one of the most difficult interfaces to control from the standpoint of reliability, producibility and maintainability.

An optical fiber cable typically includes several optical fibers enclosed in a protective jacket. The ends of the cable are typically terminated by optical fiber connectors, or backshells, which allow the optical fibers to be connected to an electrical system. The electrical system includes a receiver module having a mating connector to which the optical backshell is connected such that the input optical fibers are placed in optical contact with optical fibers in the receiver, thereby allowing a signal to be transmitted from the cable to the system. Front end optics in the receiver module then convert the received optical signal to an electrical signal for processing by the system.

The optical connectors need to be carefully inspected and cleaned before being connected to provide a reliable optical interface. In most applications, this does not pose a large problem since the optical fiber is plugged into the system once and then left alone. In certain applications, however, the cable is frequently connected and disconnected, requiring frequent inspection and cleaning of the optical connectors. This can be particularly difficult and time consuming for applications using several connectors, or for portable systems being used in the field. An antenna remoting application, for example, may include a hundred to two hundred optical connectors, each of which needing to be inspected and cleaned periodically.

Hence, a need exists in the art for an improved optical fiber connector that is easier to maintain than prior designs.

SUMMARY OF THE INVENTION

The need in the art is addressed by the optical cable backshell connector of the present invention. The novel backshell connector includes a backshell housing secured to the protective jacket of an optical cable and a mechanism disposed within the housing for converting optical signals from the optical cable into electrical signals.

In an illustrative embodiment, the backshell includes a plurality of receiver subassemblies, each receiver subassembly adapted to receive an optical signal from one of the optical fibers of the optical cable and convert the optical signal to an electrical signal. The backshell also includes an electrical output connector adapted to output the electrical signals to an electronics module.

In a preferred embodiment, each receiver subassembly includes a photodiode and a matching circuit integrated into a single package to reduce parasifics and improve performance. An optical ferrule is attached to each fiber for coupling the fiber to the receiver subassembly.

Thus, the novel backshell connector of the present teachings provides an optical cable assembly with an electrical output instead of a conventional optical output. An electrical interface may be preferable to an optical interface in certain applications, such as applications where the optical cable is frequently connected and disconnected.

BRIEF DESCRIPTION OF THE DRAWINGS

FIG. 5b is a cross-sectional side view of the backshell of FIG. 5a.

FIG. 7b is a cross-sectional side view of the backshell of FIG. 7a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
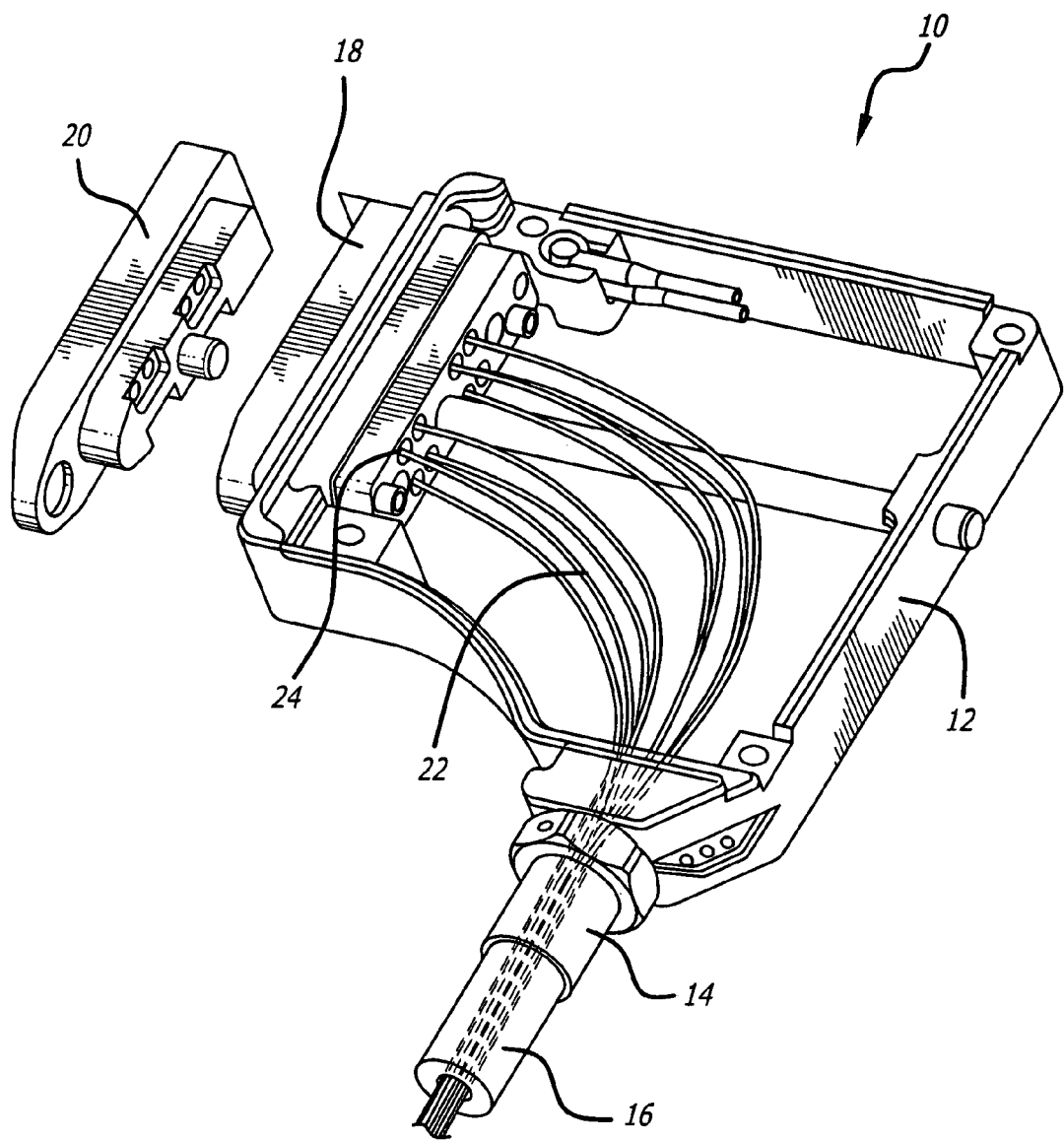
FIG. 1 is a three-dimensional view of a conventional optical backshell connector.

FIG. 1 is a three-dimensional view of a conventional optical backshell connector 10. The backshell 10 includes a housing 12 having an input boot 14 for receiving an optical cable 16 and an optical output connector 18 for connecting with a mating adapter 20 (on an electrical system having an optical receiver). In FIG. 1, the top cover of the housing 12 is removed to show the interior of the backshell 10. In the interior of the backshell 10, optical fibers 22 from the optical cable 16 are separated and inserted into individual holes 24 in the output connector 18. The optical fibers 22 may be wound into loops inside the backshell 10 before insertion into the output connector 18 to provide extra fiber length in case the optical fiber assembly needs to be reworked.

Figure 2A:
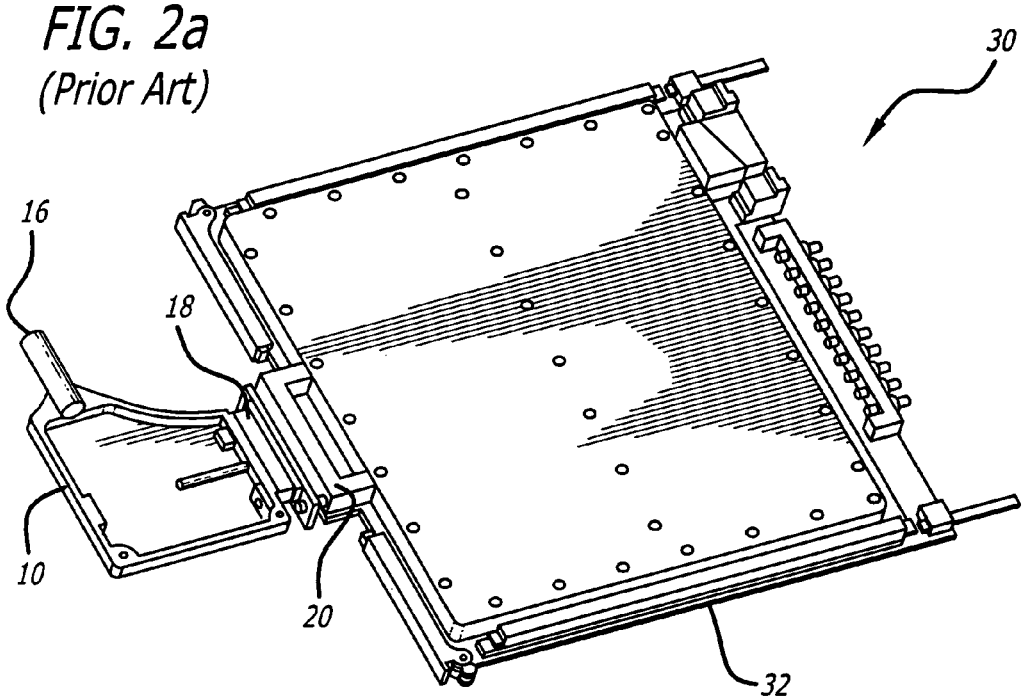
FIG. 2a is a three dimensional view of a conventional fiber optic system.
Figure 2B:
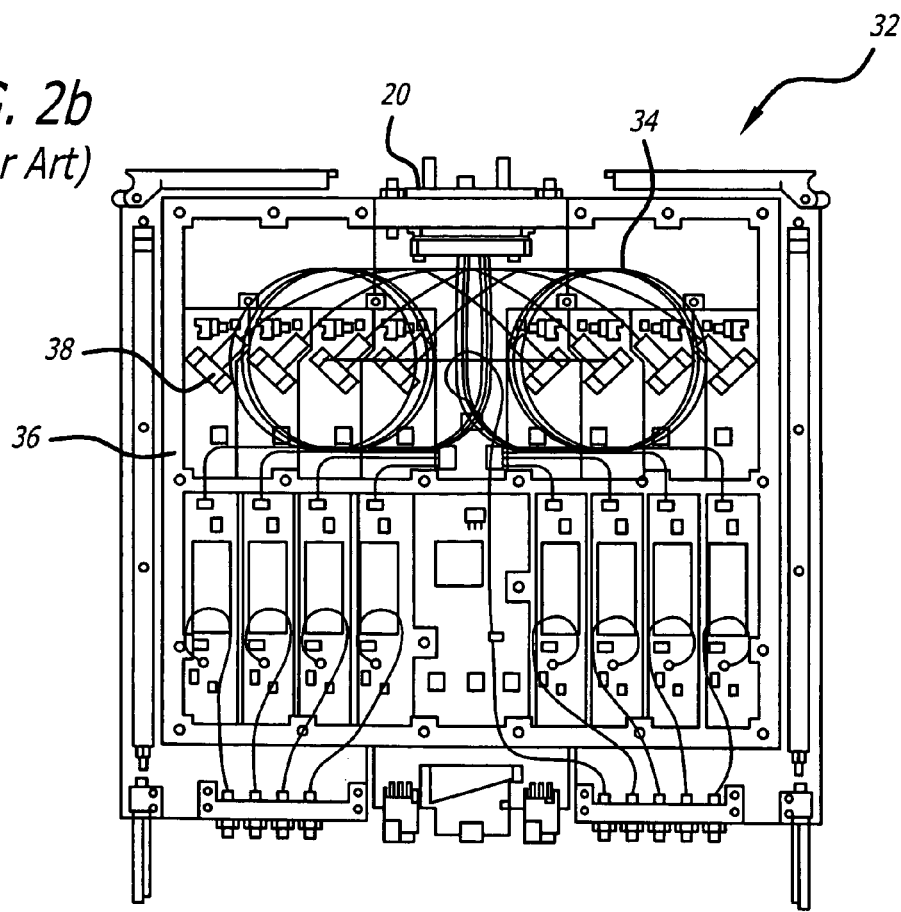
FIG. 2b is a schematic diagram of a receiver module of a conventional fiber optic system.

FIG. 2a is a three dimensional view of a conventional fiber optic system 30, which includes an optical cable 16 with a conventional optical backshell 10 connected to an electronic receiver module 32 having an optical receiver. FIG. 2b is a schematic diagram of the receiver module 32. The receiver module 32 includes an optical connector 20 for connecting with the optical connector 18 of the backshell 10. A plurality of optical fibers 34 is looped within the module 32, on top of the printed circuit board (PCB) 36. Each fiber 34 has one end inserted into the optical connector 20 and the other end coupled to a photodiode 38 mounted on the PCB 36. The photodiodes 38 convert optical signals from the optical cable 16 into electronic signals. The PCB 36 includes matching circuits and other processing circuitry for processing the electronic signals from the photodiodes 38.

In addition to the maintenance difficulties associated with cleaning the optical connectors 18 and 20 as discussed above, the receiver module 32 also includes optical fibers 34 for receiving the optical signals from the cable 16 and transmitting them to the photodiodes 38. Installation of the fibers 34 on the module 32 often require tight looping of the fibers 34, which can result in stressed optical fibers and reduced performance and/or reliability. It can also be difficult to troubleshoot any problems in the module 32 without damaging the fibers 34.

In accordance with the teachings of the present invention, the optical interface between the optical cable and the receiver module is eliminated by integrating optics inside the cable backshell. This allows for an electrical interface at the end of the optical cable, eliminating the need for optical cleaning and inspection of the connectors. It also saves space on the receiver board.

Figure 3:
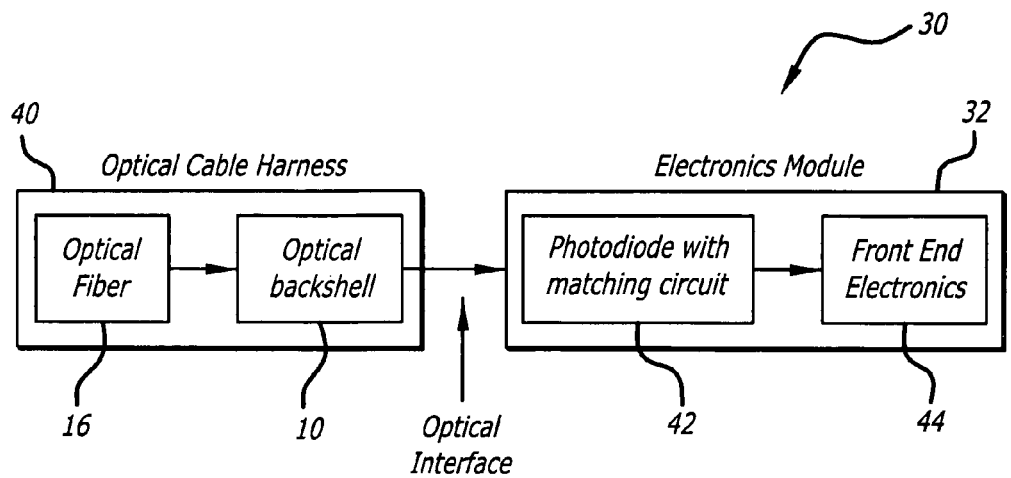
FIG. 3 is a simplified block diagram of a conventional fiber optic-system.

FIG. 3 is a simplified block diagram of a conventional fiber optic system 30, which includes a conventional optical cable harness 40 connected to an electronics module 32 via an optical interface. The optical cable harness 40 includes an optical cable 16, which includes a plurality of optical fibers, and a conventional optical backshell 10 for outputting the optical signals from the optical fibers. The electronics module 32 includes an optical receiver 42, which includes the photodiodes and matching circuits, adapted to receive the optical signals from the backshell 10 and convert them to electrical signals for the front-end electronics 44.

Figure 4:
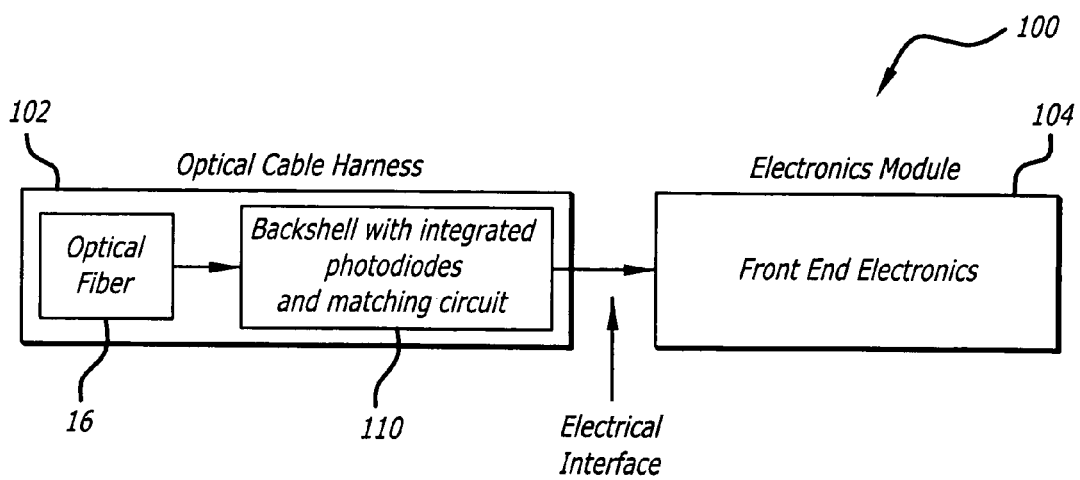
FIG. 4 is a simplified block diagram of a fiber optic system designed in accordance with an illustrative embodiment of the present invention.

FIG. 4 is a simplified block diagram of a fiber optic system 100 designed in accordance with an illustrative embodiment of the present invention. The system 100 includes an optical cable harness 102 that is connected to an electronics module 104 by an electrical interface, instead of an optical interface as in conventional designs. The optical cable harness 102 includes an optical cable 16 containing a plurality of optical fibers, and a novel backshell 110 attached to an end of the optical cable 16. The novel backshell 110 is adapted to receive the optical signals from the optical fibers in the cable 16 and output corresponding electrical signals through an electrical connector. The electronics module 104 includes a mating electrical connector adapted to receive the electrical signals from the cable backshell 110. The electronics module 104 therefore does not require any optical components; it includes only the front-end electronics for processing the received signal.

Figure 5B:
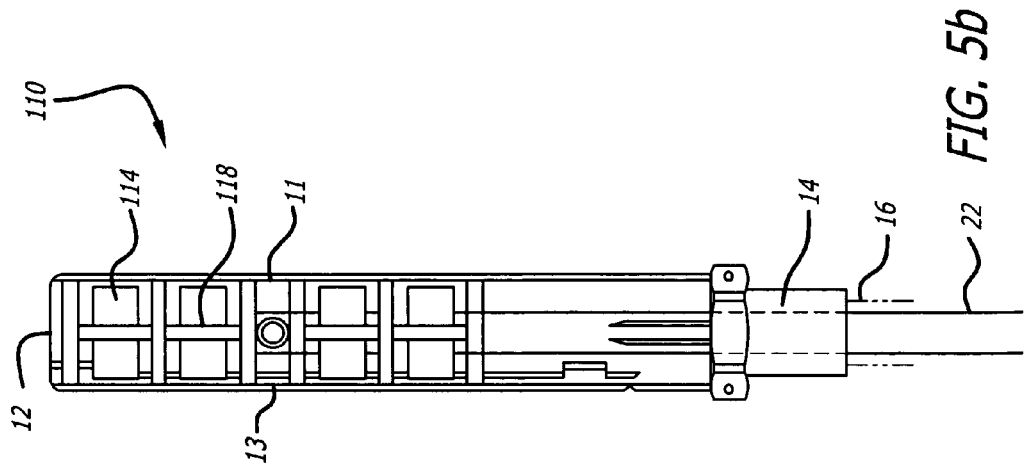
Figure 5A:
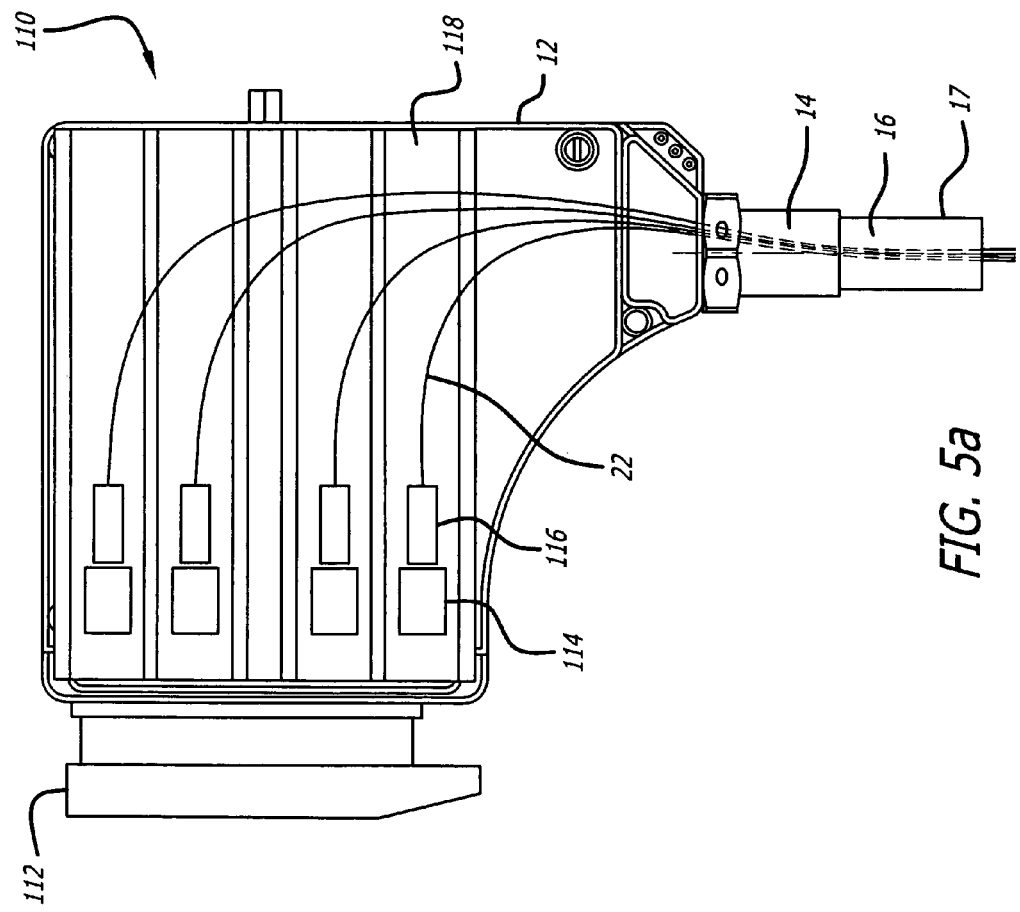
FIG. 5a is a cross-sectional view of an optical cable backshell connector designed in accordance with an illustrative embodiment of the present invention.
Figure 5C:
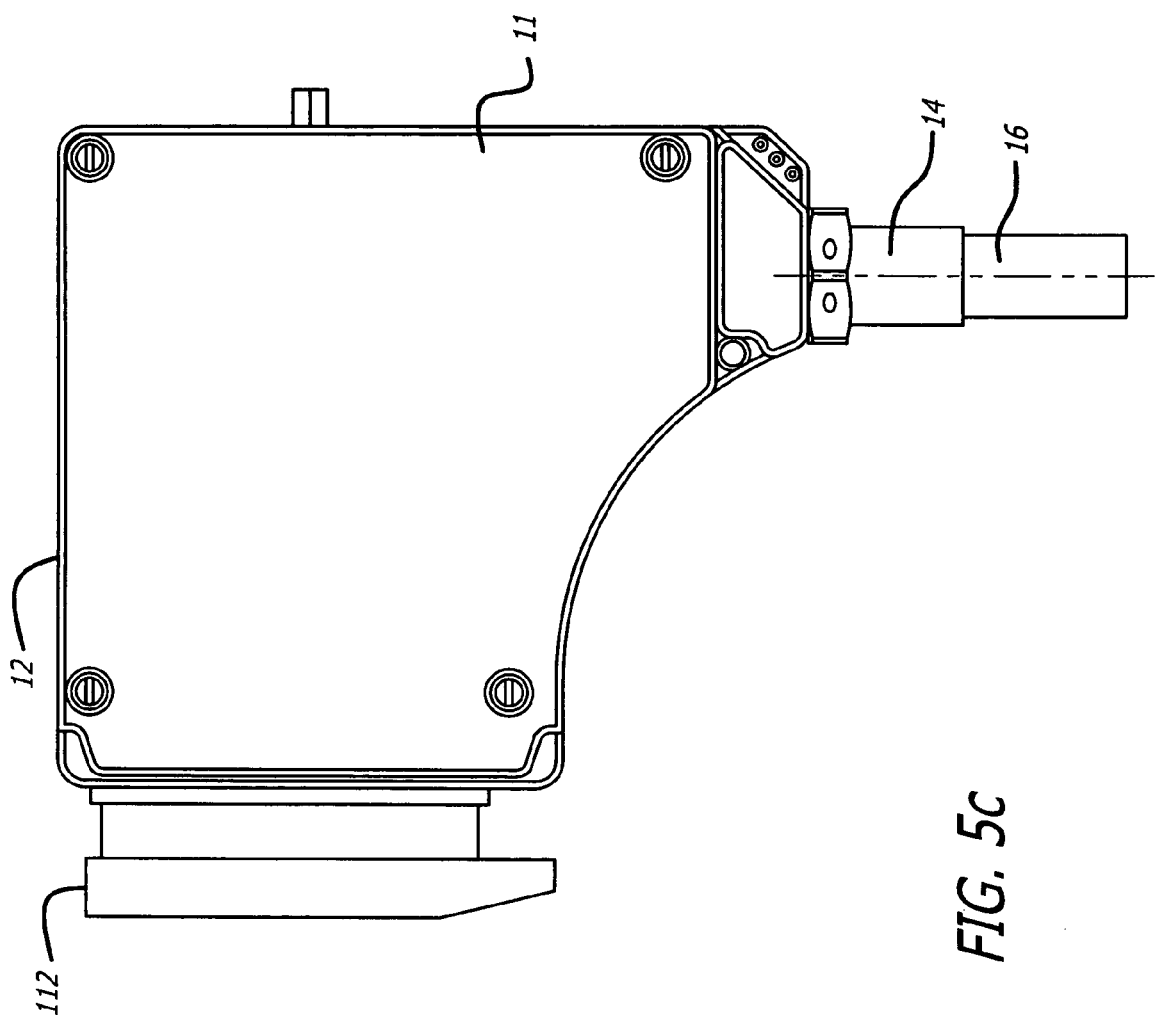
FIG. 5c is a top view of an assembled backshell designed in accordance with an illustrative embodiment of the present invention.

FIG. 5a is a cross-sectional view of an optical cable backshell connector 110 designed in accordance with an illustrative embodiment of the present invention. FIG. 5b is a cross-sectional side view of the backshell 110 of FIG. 5a. FIG. 5c is a top view of an assembled backshell 110 designed in accordance with an illustrative embodiment of the present invention.

The novel backshell 110 includes a housing 12 having an input port 14 for receiving a plurality of optical signals from an optical cable 16 and an output port for an electrical connector 112, which outputs corresponding electrical signals. The optical cable 16 includes a protective jacket 17 containing a plurality of optical fibers 22. The input port 14 may include a strain-relief boot for securing the optical cable 16 by securing the protective jacket 17 to the housing 12. The housing 12 may also include a removable top cover 11 and bottom cover 13 for allowing access to the fibers 22 and other internal components of the backshell 110.

Within the backshell 110, each fiber 22 is input to an optical receiver subassembly 114 adapted to receive an optical signal from the fiber 22 and convert it to an electrical signal. In a preferred embodiment, each fiber 22 is coupled to a receiver subassembly 114 using a removable ferrule 116 to allow for easy rework of the fibers 22. The electrical signals output from the receiver subassemblies 114 are coupled to the electrical connector 112, which may include a plurality of pins or electrical contacts that can be coupled to an appropriate mating connector on the electronic module 104. The electrical connector 112 may also include one or more pins for receiving supply voltages from the electronic module 104 for providing bias voltages to the receiver subassemblies 114. For better performance, bias pins should be provided for all of the receiver subassemblies 114. As shown in FIG. 5c, the housing 12 forms a sealed enclosure protecting the optical fibers 22 and electrical components 114 within the backshell 110.

In the illustrative embodiment, the optical receiver subassemblies 114 are mounted on a PCB 118, which may include matching circuits and other electrical components adapted to process the electrical signals before they are output from the backshell 110. The receiver subassemblies 114 and electrical circuitry can be mounted on both sides of the PCB 118. In the illustrative embodiment, the backshell 110 includes eight channels, including eight optical fibers 22 coupled to eight receiver subassemblies 114, four mounted on each side of the PCB 118 (as shown in FIG. 5b).

In a preferred embodiment, the backshell 110 has a modular design which allows for easy assembly, replacement of parts, and scalability of channels. To make a small modular design, it would be desirable to use receiver subassemblies 114 that include photodiodes with matching circuits integrated in the same package. It is also desirable to use a photodiode package 114 that allows for a pluggable ferrule optical interface. This would make it easier to build optical cable harnesses without the need for optical fiber splicing.

Figure 6A:
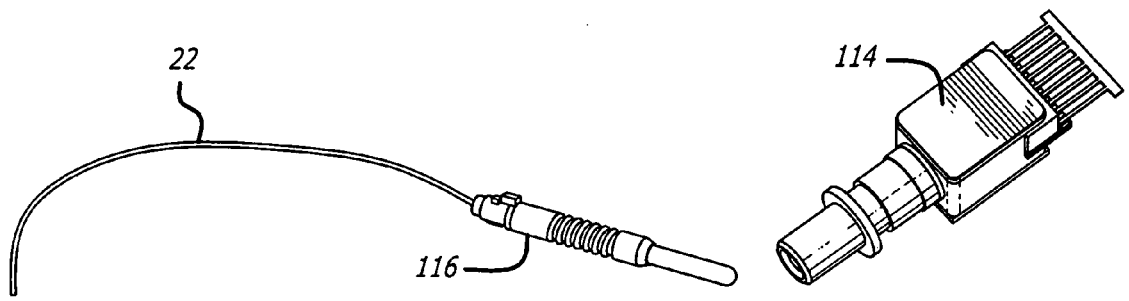
FIG. 6a is a three-dimensional view of an illustrative receiver subassembly that can be used in a backshell designed in accordance with the present teachings.

FIG. 6a is a three-dimensional view of an illustrative receiver subassembly 114 that can be used in a backshell 110 designed in accordance with the present teachings. The receiver subassembly 114 is adapted to receive an optical signal from an optical fiber 22 and convert it to an electronic signal. In a preferred embodiment, the receiver subassembly 114 is adapted to receive an optical signal from the fiber 22 using an optical LC ferrule 22. The optical fiber 22 is inserted inside the ferrule 116, which holds and aligns the fiber 22, allowing it to be easily connected and disconnected from the receiver subassembly 114.

Figure 6B:
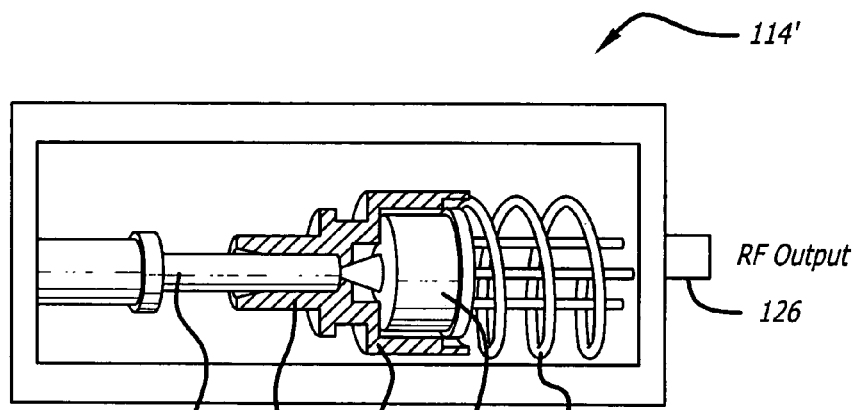
FIG. 6b is a cross-sectional view of an illustrative receiver subassembly that can be used in a backshell designed in accordance with the present teachings.

FIG. 6b is a cross-sectional view of an illustrative receiver subassembly 114' that can be used in a backshell 110 designed in accordance with the present teachings. The receiver subassembly 114' includes a package housing 120 having an input port 122 adapted to receive an optical ferrule 116. A photodiode 124 is disposed within the housing 120 to receive an optical signal from the ferrule 116 and convert it to an electrical RF signal, which is output from the subassembly 114' by an RF output connection 126. The subassembly 114' may also include a mechanism 128 for shielding the RF output.

Commercially available optical receiver subassemblies 114', such as the one shown in FIG. 6b, can be used in the backshell 110 of the present invention. In a preferred embodiment, however, the receiver subassembly 114 uses a novel design that integrates a matching circuit within the photodiode package.

Figure 6C:
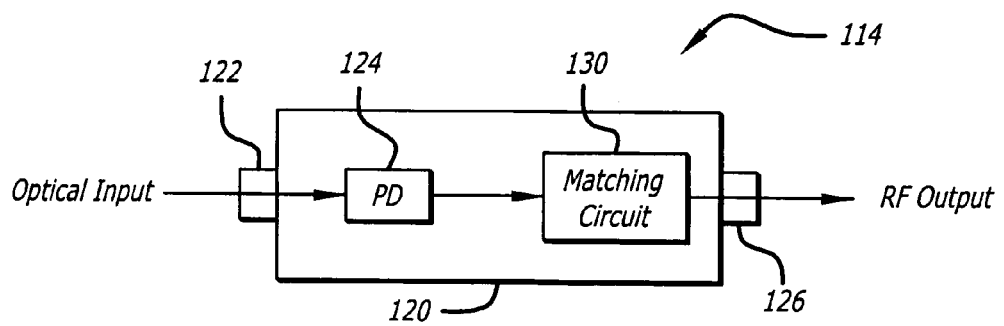
FIG. 6c is a simplified block diagram of an optical receiver subassembly designed in accordance with an illustrative embodiment of the present invention.

FIG. 6c is a simplified block diagram of an optical receiver subassembly 114' designed in accordance with an illustrative embodiment of the present invention. The novel receiver subassembly 114' includes a photodiode 124 and matching circuit 130 integrated in a single package. A housing 120 encloses the photodiode 124 and matching circuit 130 in a hermetically sealed cavity, and includes an input port 122 adapted to receive an optical signal via an optical ferrule and an output 126 adapted to output an electrical RF signal. By integrating the matching circuit 130 in the photodiode package 114 so that the matching circuit components 130 are closer to the photodiode 124, parasitics may be reduced, improving system performance.

In the illustrative embodiment shown in FIGS. 5a-5c, the backshell housing 12 has to be opened up (i.e., the top cover 11 or back cover 13 removed) to insert or remove fibers 22 from the photodiode assemblies 114. This design provides more space for electronic circuitry inside the backshell 110. In an alternative design, shown in FIGS. 7a and 7b, the integrated photodiodes 114 are self-contained in a separate removable optical to electrical adapter.

Figure 7B:
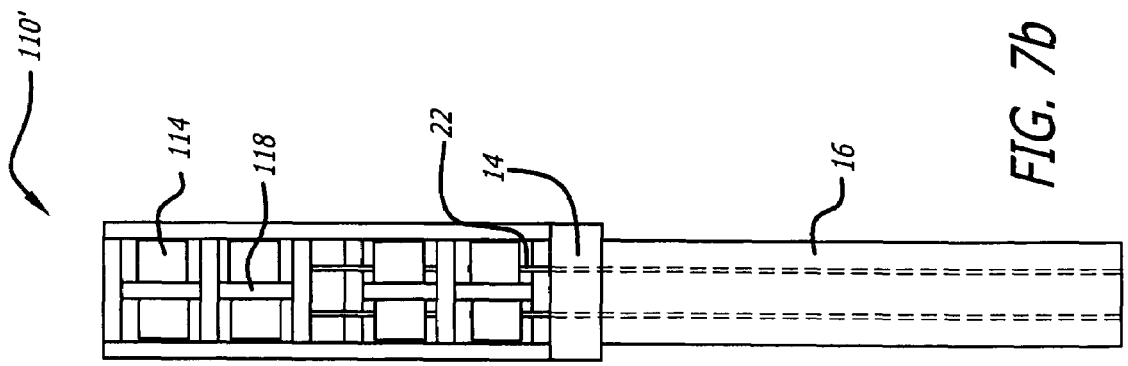
Figure 7A:
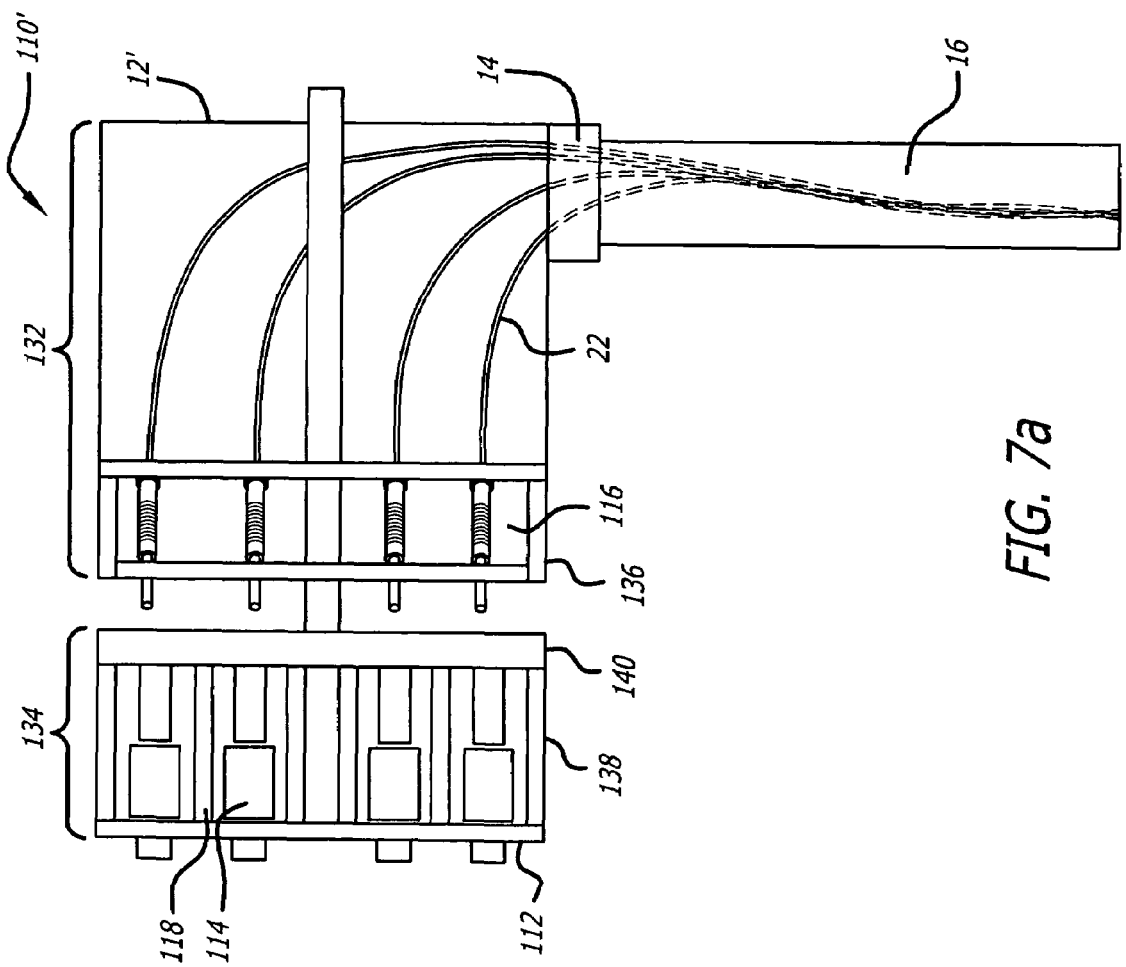
FIG. 7a is a cross-sectional view of an alternative embodiment of an optical cable backshell connector designed in accordance with the present teachings.

FIG. 7a is a cross-sectional view of an alternative embodiment of an optical cable backshell connector 110' designed in accordance with the present teachings. FIG. 7b is a cross-sectional side view of the backshell 110' of FIG. 7a. The alternative backshell 110' of FIGS. 7a and 7b contains the same components as the backshell 110 of FIGS. 5a-5c described above, but in two separable pieces: a multi-pin optical connector assembly 132 and an optical to electrical adapter 134.

The multi-pin optical connector assembly 132 includes a housing 12' having an input port 14 for receiving an optical cable 16 and an optical output connector 136 for outputting a plurality of optical signals via removable ferrules 116. The optical cable 16 includes a plurality of optical fibers 22. Each fiber 22 is inserted in an optical LC ferrule 116, which is inserted into the optical output connector 136. The output connector 136 includes a plurality of holes, each hole adapted to hold a ferrule 116. The ferrules 116 allow the fibers 22 to be easily connected and disconnected from the optical connector 136. The optical to electrical adapter 134 includes a housing 138 having an optical input connector 140 adapted to receive optical signals from the optical connector assembly 132 and an electrical connector 112 for outputting electrical signals to an electronic unit. A plurality of receiver subassemblies 114 for converting optical signals to electronic signals is disposed within the optical to electrical adapter 134. Each receiver subassembly 114 is adapted to receive an optical input signal via an optical ferrule 116 and output a corresponding electrical output, which is coupled to an electronics module 104 (shown in FIG. 4) via the electrical connector 112. The receiver subassemblies 114 are mounted on a PCB 118, which may include additional matching circuits or processing circuitry.

The input connector 140 of the optical to electrical adapter 134 is attached to the output connector 136 of the optical connector assembly 132, thereby coupling the optical ferrules 116 to the receiver subassemblies 114. Once the backshell 110' is assembled, the interface between the connector assembly 132 and optical to electrical adapter 134 can be sealed, and the entire assembly 110' can be treated as a single unit having a robust electrical interface for frequent connects and disconnects.

This design allows for easier troubleshooting. If a photodiode package 114 is damaged or defective, it can be replaced without having to move the optical fibers 22. The optical components would remain protected in the sealed housing 12' of the connector assembly 132. Alternatively, the entire optical to electrical adapter 134 can be easily replaced if one or more of the channels are damaged.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A backshell connector for an optical cable including a plurality of optical fibers and a protective jacket, said backshell connector comprising:
    a backshell housing secured to said protective jacket;
    one or more photodetectors disposed within said housing, each photodetector adapted to convert an optical signal from one of said optical fibers into an electrical signal; and
    first means for biasing each photodetector.

2. The invention of claim 1 wherein said photodetectors are photodiodes.

3. The invention of claim 1 wherein each photodetector is enclosed within a receiver subassembly housing.

4. The invention of claim 3 wherein said backshell connector further includes a plurality of ferrules, each ferrule attached to an end of one of said optical fibers.

5. The invention of claim 4 wherein each receiver subassembly housing is adapted to receive and hold one of said ferrules such that the optical fiber attached to said ferrule is aligned with the photodetector enclosed by said receiver subassembly housing.

6. The invention of claim 3 wherein said backshell connector further includes a matching circuit enclosed within each receiver subassembly housing and coupled to an output of the photodetector housed within said receiver subassembly housing.

7. The invention of claim 6 wherein each photodetector and matching circuit are disposed within a hermetically sealed receiver housing.

8. The invention of claim 3 wherein said receiver subassembly housings are mounted on a printed circuit board disposed within said backshell housing.

9. The invention of claim 8 wherein said printed circuit board includes circuitry for processing said electrical signals.

10. The invention of claim 1 wherein said backshell connector further includes an electrical connector for outputting said electrical signals.

11. The invention of claim 1 wherein said first means includes a mechanism for receiving one or more supply voltages for providing a bias voltage to each photodetector.

12. The invention of claim 1 wherein said backshell connector is separable into two pieces: a first backshell subassembly for receiving said optical fibers and a second backshell subassembly for converting said optical signals to electrical signals.

13. The invention of claim 12 wherein said first backshell subassembly includes a first backshell housing having an input port for receiving said optical fibers and securing said protective jacket to said housing, and a first optical connector for outputting optical signals from said optical fibers to said second backshell assembly.

14. The invention of claim 13 wherein said second backshell subassembly includes said photodetectors disposed within a second backshell housing, a second optical connector for receiving said optical signals from said first backshell subassembly, and an electrical connector for outputting said electrical signals.

15. The invention of claim 14 wherein said first optical connector is adapted to receive a plurality of ferrules, each ferrule attached to an end of one of said optical fibers.

16. The invention of claim 15 wherein said second optical connector is adapted to couple optical signals from said ferrules to said photodetectors.

17. A backshell connector for an optical cable including a plurality of optical fibers and a protective jacket, said backshell connector comprising:
   a backshell housing having an input port for receiving said optical fibers and an output port, said backshell housing being secured to said protective jacket at said input port;
   a plurality of ferrules, each ferrule attached to an end of one of said optical fibers;
   a plurality of receiver subassemblies disposed within said backshell housing, wherein each receiver subassembly includes a receiver housing adapted to receive and hold one of said ferrules, a photodetector disposed within said receiver housing adapted to receive an optical signal from the optical fiber attached to said ferrule and convert said optical signal to an electrical signal, and a matching circuit coupled to an output of each photodetector; and;
   an electrical connector disposed within said output port and adapted to output said electrical signals and receive one or more supply voltages for said receiver subassemblies.

18. A backshell connector for an optical cable including a plurality of optical fibers and a protective jacket, said backshell connector comprising:
   a first backshell subassembly including a first backshell housing with an input port for receiving said optical fibers and securing said protective jacket to said first backshell housing, and a first optical connector for outputting optical signals from said optical fibers, and
   a second backsbell subassembly including a second backshell housing, a second optical connector for receiving said optical signals from said first optical connector, a plurality of photodetectors disposed within said second backshell housing, each photodetector adapted to convert one of said optical signals to an electrical signal, and an electrical connector for outputting said electrical signals and receiving one or more supply voltages for biasing said photodetectors,
   wherein said first backshell subassembly is connected to said second backshell subassembly by said first and second optical connectors to form a single backshell unit secured to said optical cable.

19. An optical cable harness comprising:
   an optical cable containing a plurality of optical fibers and a protective jacket and
   a backshell connector secured to said protective jacket and adapted to convert optical signals from said optical fibers to electrical signals, said backshell connector including:
   a plurality of photodetectors, each photodetector adapted to convert an optical signal from one of said optical fibers into an electrical signal, and
   an electrical connector adapted to output said electrical signals and receive one or more supply voltages for biasing said photodetectors.

20. A backshell connector for an optical cable including a plurality of optical fibers and a protective jacket, said backshell connector comprising:
   a backshell housing secured to said protective jacket;
   a plurality of photodetectors disposed within said housing, each photodetector adapted to convert an optical signal from one of said optical fibers into an electrical signal; and
   an electrical connector having a plurality of electrical contacts for outputting said electrical signals and one or more electrical contacts for receiving one or more supply voltages for biasing said photodetectors.

21. A method for connecting an optical cable to an electronics module including the steps of:
   providing a backshell connector secured to said optical cable for connecting said optical cable to said electronics module;
   coupling optical signals from said optical cable to photodetectors disposed within said backshell connector;
   biasing said photodetectors to operate at a desired operating point;
   converting said optical signals to electronic signals in said photodetectors; and
   outputting said electronic signals to said electronics module.

22. The invention of claim 1 wherein said backshell connector further includes a matching circuit coupled to each photodetector.

23. The invention of claim 11 wherein said mechanism includes an electrical connector having one or more electrical contacts for receiving said supply voltages.

24. The invention of claim 23 wherein said electrical connector also includes a plurality of electrical contacts for outputting said electrical signals.

* * * * *